United States Patent [19]

Gould

[11] 4,002,122
[45] Jan. 11, 1977

[54] MICROJET FUSE

[75] Inventor: Bert B. Gould, Berkeley, Calif.

[73] Assignee: MB Associates, San Ramon, Calif.

[22] Filed: Mar. 2, 1961

[21] Appl. No.: 92,963

[52] U.S. Cl. .................. 102/70.2 A; 102/28 R; 102/70 R

[51] Int. Cl.² ........................................ F42C 19/12

[58] Field of Search .................. 102/70.2, 86.5, 70, 102/28, 46, 98; 60/35.6 RS

[56] References Cited

UNITED STATES PATENTS

| | | | |
|---|---|---|---|
| 2,262,925 | 11/1941 | Cole | 102/38 |
| 2,313,030 | 3/1943 | Tauschek | 102/46 |
| 2,469,350 | 5/1949 | Lauritsen | 102/70.2 |
| 2,697,325 | 12/1954 | Spaulding | 60/35.6 RS |
| 2,921,521 | 1/1960 | Haye et al. | 102/46 |
| 2,926,566 | 3/1960 | Atkins et al. | 102/86.5 |
| 2,956,401 | 10/1960 | Kane | 60/35.6 RS |
| 2,959,001 | 11/1960 | Porter | 102/70 |
| 2,960,932 | 11/1960 | Scherrer | 102/70.2 |
| 2,974,596 | 3/1961 | Allen | 102/70 |
| 3,009,419 | 11/1961 | Clay, Jr. et al. | 102/46 |
| 3,062,147 | 11/1962 | Davis et al. | 102/70 |
| 3,128,600 | 4/1964 | Oldham | 60/35.6 RS |

Primary Examiner—Charles T. Jordan

EXEMPLARY CLAIM

1. An igniter for a miniature solid propellant rocket containing a propellant grain and a nozzle comprising in combination
    a. a solid propellant grain having a central burning perforation extending substantially the length thereof;
    a₁. a housing enclosing the grain in which the housing is closed at the front end and open at the rear end
    b. a pyrotechnic coating on substantially the entire surface of said propellant grain;
    c. an electrical ignition wire extending substantially the length of the perforation of said propellant grain, said ignition wire being comprised of first and second sections, said first section being bare resistance wire and said second section being an insulated return wire connected to the bare resistance wire at its front end located in the forward end portion of the perforation; and
    d. means for supplying current through said insulated wire and said resistance wire whereby the forward end portion of the resistance wire heats up at least as rapidly as the remainder to ignite the pyrotechnic material at the forward end portion of the perforation as soon as the remainder whereby the flame upon ignition of the pyrotechnic material is confined for flow rearwardly through the perforation substantially instantaneously to ignite the propellant grain throughout its length.

4 Claims, 2 Drawing Figures

INVENTOR:—
BERT B. GOULD
BY
*Eckhoff & Slick*
ATTORNEYS

MICROJET FUSE

This invention relates to a method and apparatus for igniting miniature solid propellant rockets.

The ignition of large solid propellant rockets presents no particular problems, but the ignition of miniature rockets involves serious problems. For one thing, the physical sizes are so small that conventional ignition systems cannot be scaled down sufficiently. Further, the burning time of miniature rockets is so short that substantially uniform ignition must be obtained instantly throughout the rocket in order to secure efficient use of the propellant and to prevent excessive tail or end burning. The miniature rockets to which this invention relates are extremely small in size wherein the rocket has a diameter of about 1/10 inch, and a length of 1½ inches. Ordinarily a central burning perforation of about 0.05 inch is employed with a throat diameter of only 0.03 inch. Thus, the ignition system must be extremely small and be adapted for insertion through a throat of only 30 mils diameter.

It has been found that satisfactory ignition can be obtained of such miniature rockets by the employment of a hot wire device which produces a substantial amount of heat within the rocket which is sufficient to ignite a pyrotechnic mixture which in turn ignites the grain of the rocket. Preferably, this is in the form of a single length of resistance wire extending substantially for the length of the perforation, with an insulated return wire lying beside the resistance wire.

The pyrotechnic mixture may be an igniter material such as black powder, $Sb_2S_3$ and $Ba(NO_3)_2$, boron and $KNO_3$, aluminum and $KClO_4$, lead mononitro resorcinate and $KClO_3$; or a thermite material such as aluminum and $Fe_2O_3$, aluminum and $Fe_3O_4$, $CaSi_2$ and $Pb_3O_4$, $CaSi_2$ and $PbO_2$; or a combination of both igniter and thermite types in separate layers. A small percentage of a binder such as plastic or nitrocellulose is needed for adhesion. The pyrotechnic may be applied as a coating to the perforation of the propellant grain or it may be used to impregnate a strand of a textile material, such as cotton thread or linters, which is inserted in and runs the length of the perforation. It will be noted that only sufficient current is used to heat the wire since if large amounts of current are used which would cause the wire to vaporize rapidly, ignition would not be secured.

In the drawings forming part of this application:

Figure 1:
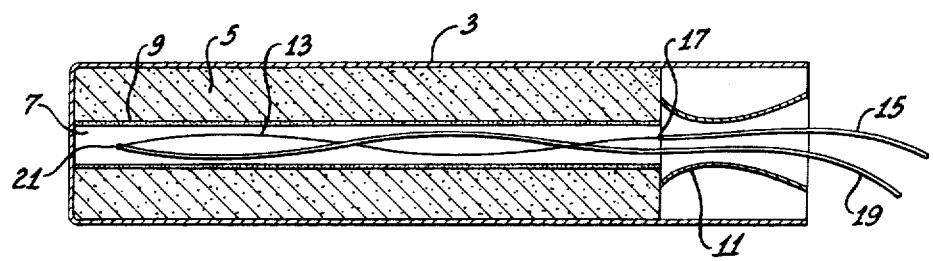
FIG. 1 is a sectional view of a rocket motor casing showing one method of igniting the propellant.

Turning now to a description of the drawings by reference characters, there is shown in FIG. 1 a drawn metal casing 3 having a propellant grain 5 therein with a central burning perforation 7. The casing 3 is normally made of drawn metal and it is adapted for insertion in an outer casing, not illustrated, having a streamlined point thereon and guiding fins. Of course, in many instances miniature rockets are made with only a single casing wherein the casing is drawn or otherwise formed to the desired external configuration and the propellant grain and nozzle placed directly therein. The grain 5 is coated with a pyrotechnic mixture 9. The grain may be any typical solid propellant material such as double-base, or polyurethane loaded with aluminum dust and ammonium perchlorate. The rocket also has a nozzle section 11 which may be formed as part of the casing 3 or formed from a separate piece and inserted therein.

In order to secure proper ignition, a wire 13 of an electrically resistant material such as nichrome runs the length of the perforation. An insulated conducting wire 15, such as copper wire coated with plastic, is joined to the nichrome wire at its entry into the perforation at 17. A similar wire 19 runs the length of the port and is joined to the nichrome wire at 21. It will be seen that this structure is of extremely small diameter so that it can be easily inserted through the throat of the nozzle into the perforation.

Figure 2:
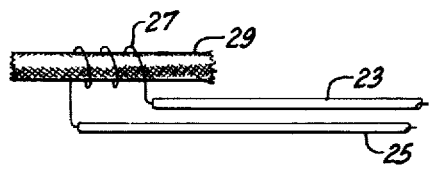
FIG. 2 is an enlarged partial view of another ignition system.

In FIG. 2 another embodiment is shown wherein insulated wires 23 and 25 are connected with a short piece of nichrome wire 27. The nichrome wire 27 is looped one or more times around a strand of a textile material 29 which has been impregnated with a pyrotechnic mixture. Normally the strand of textile material 29 would be of substantially the same length as the port of the rocket grain. This assembly is also compact and can be easily inserted through the nozzle and into the perforation.

To fire the rocket motor it is only necessary to supply sufficient current to heat the nichrome wire which ignites the pyrotechnic mixture. This in turn ignites the propellant grain throughout its length.

I claim:

1. An igniter for a miniature solid propellant rocket containing a propellant grain and a nozzle comprising in combination
    a. a solid propellant grain having a central burning perforation extending substantially the length thereof;
    a₁. a housing enclosing the grain in which the housing is closed at the front end and open at the rear end
    b. a pyrotechnic coating on substantially the entire surface of said propellant grain;
    c. an electrical ignition wire extending substantially the length of the perforation of said propellant grain, said ignition wire being comprised of first and second sections, said first section being bare resistance wire and said second section being an insulated return wire connected to the bare resistance wire at its front end located in the forward end portion of the perforation; and
    d. means for supplying current through said insulated wire and said resistance wire whereby the forward end portion of the resistance wire heats up at least as rapidly as the remainder to ignite the pyrotechnic material at the forward end portion of the perforation as soon as the remainder whereby the flame upon ignition of the pyrotechnic material is confined for flow rearwardly through the perforation substantially instantaneously to ignite the propellant grain throughout its length.

2. The propellant igniter of claim 1, wherein said resistance section of said igniter wire is nichrome and said igniter wires enter the perforation of said propellant grain through said nozzle.

3. The propellant igniter of claim 1, wherein said pyrotechnic is an igniter or thermite selected from the class consisting of black powder, $SB_2S_3$ and $Ba(NO_3)_2$, boron and $KNO_3$, aluminum and $KClO_4$, lead mononitro resorcinate and $KClO_3$, aluminum and $Fe_2O_3$, aluminum and $F_3O_4$, $CaSI_2$ and $Pb_3O_4$, and $CaSI_2$ and $Pbo_2$.

4. The propellant grain igniter of claim 1, wherein said pyrotechnic comprises separate layers of thermite and an igniter composition.

* * * * *